(12) United States Patent
Smith et al.

(10) Patent No.: US 10,166,493 B2
(45) Date of Patent: Jan. 1, 2019

(54) MOBILE FLOCCULATION AND FRACKING WATER TREATMENT SYSTEM

(71) Applicant: Wild North Vac & Steam Ltd., Fort St. John (CA)

(72) Inventors: Chad Clark Smith, Fort St. John (CA); Douglas Moore, Fort St. John (CA)

(73) Assignee: Wild North Vac & Steam Ltd., Fort St. John, British Columbia (CA)

( * ) Notice: Subject to any disclaimer, the term of this patent is extended or adjusted under 35 U.S.C. 154(b) by 0 days.

(21) Appl. No.: 15/912,920

(22) Filed: Mar. 6, 2018

(65) Prior Publication Data
US 2018/0257004 A1   Sep. 13, 2018

Related U.S. Application Data

(62) Division of application No. 14/036,711, filed on Sep. 25, 2013, now Pat. No. 9,937,443.

(30) Foreign Application Priority Data

Sep. 28, 2012   (CA) ...................................... 2791441

(51) Int. Cl.
| | | |
|---|---|---|
| *B01D 21/00* | (2006.01) | |
| *C02F 1/52* | (2006.01) | |
| *B01D 21/01* | (2006.01) | |
| *C02F 103/10* | (2006.01) | |

(52) U.S. Cl.
CPC ....... *B01D 21/0018* (2013.01); *B01D 21/003* (2013.01); *B01D 21/0039* (2013.01); *B01D 21/0087* (2013.01); *B01D 21/01* (2013.01); *C02F 1/52* (2013.01); *B01D 2221/04* (2013.01); *B01D 2221/08* (2013.01); *C02F 2103/10* (2013.01); *C02F 2201/008* (2013.01)

(58) Field of Classification Search
CPC ................................................. B01D 21/0018
See application file for complete search history.

(56) References Cited

U.S. PATENT DOCUMENTS

| | | |
|---|---|---|
| 4,536,286 A | 8/1985 | Nugent |
| 5,071,166 A | 12/1991 | Marino |
| 5,333,752 A | 8/1994 | Harding, Jr. |
| 7,718,054 B2 | 5/2010 | Duplessis et al. |

FOREIGN PATENT DOCUMENTS

AU   2012100625   6/2012

*Primary Examiner* — Peter Keyworth
(74) *Attorney, Agent, or Firm* — Antony C. Edwards

(57) ABSTRACT

A mobile flocculation and water treatment system includes at least one tank, preferably a series of adjoining tanks separated by weirs, and an adjacent pump house mounted on a mobile platform. At least one pump is mounted in the pump house. Fluid conduits run from the pumps to the tank. An overflow is mounted between the downstream tank and the pump house whereby fluid overflow from the tanks is directed into the pump house. The pump house provides a substantially water-tight reservoir zone to provide secondary containment. Water to be treated enters the upstream end of the tanks and is discharged from the downstream end.

10 Claims, 11 Drawing Sheets

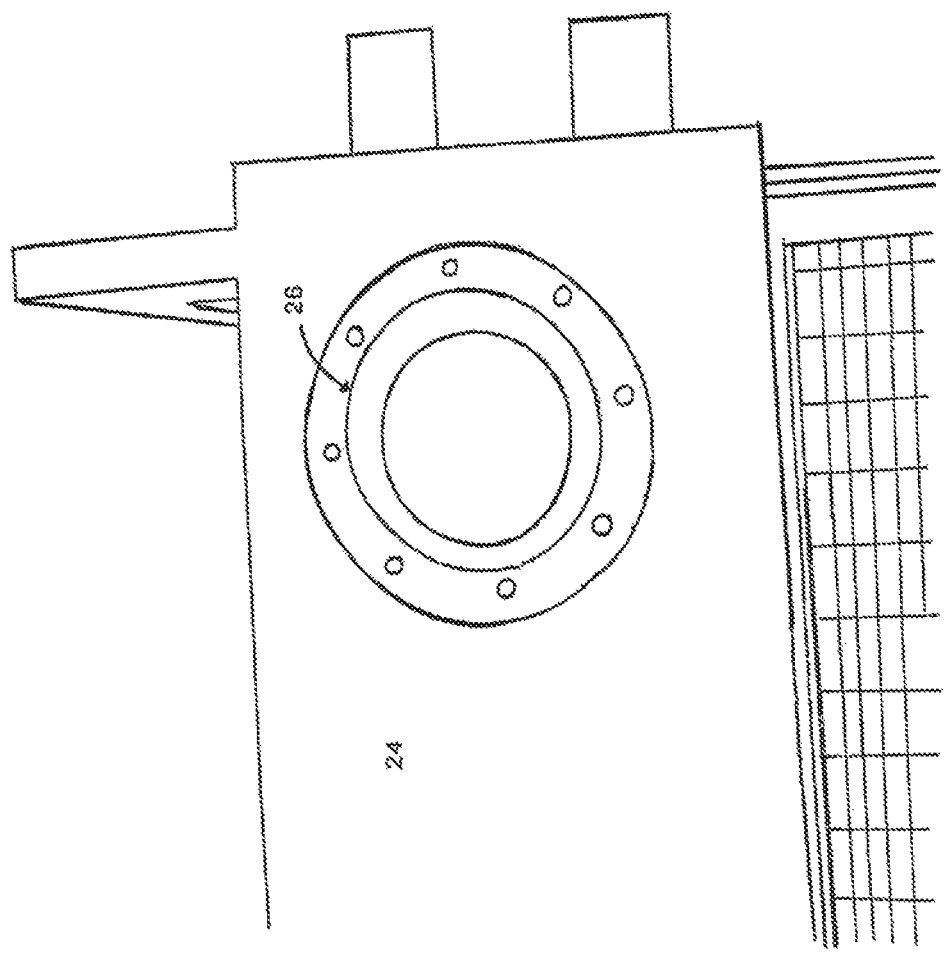

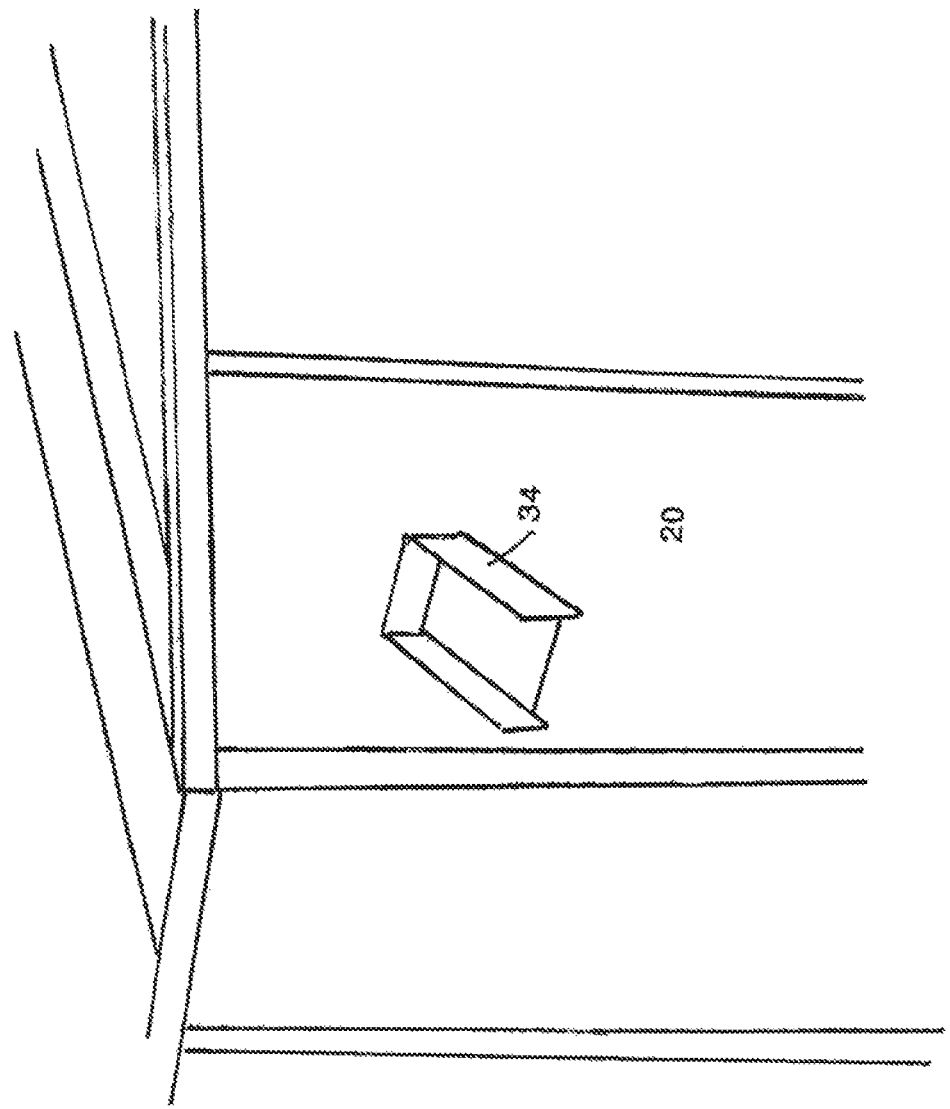

1

MOBILE FLOCCULATION AND FRACKING WATER TREATMENT SYSTEM

CROSS REFERENCE TO RELATED APPLICATIONS

This application is a divisional application of U.S. patent application Ser. No. 14/036,711 filed Sep. 25, 2013 which in turn claims priority from Canadian Patent Application No. 2,791,441 filed Sep. 28, 2012, both entitled Mobile Flocculation and Fracking Water Treatment System, entireties of which are incorporated herein by reference.

FIELD OF THE INVENTION

This invention relates to the field of settling or flocculation tanks and in particular to an improved mobile flocculation and fracking water treatment system wherein a series of settling or flocculation tanks having a progression of weirs therebetween may be employed serially or individually bypassed to allow cleaning of a particular tank and wherein overflow is captured in at least a pump house mounted in-line with the tanks on an elongate skid or other mobile platform.

BACKGROUND OF THE INVENTION

As described by Kennedy et al in U.S. Pat. No. 8,110,115, water is essential to the oil and gas industry. In an oil or gas well, water is used to cool and lubricate the drillbit and to extract debris. Accordingly, drilling a well may require hundreds of thousands of gallons of water. Water is also recovered as a byproduct of oil and gas wells as produced water.

Furthermore, the process of hydraulic fracturing uses a large amount of water. Hydraulic fracturing, or fracking (as it is commonly called and used herein), is a commonly used process to increase production and recovery in an oil or gas well. In hydraulic fracturing, fluid is injected at high pressure into a well to crack or fracture in the rock structures possessing hydrocarbons. The fracture width is usually maintained through the use of a proppant such as sand, ceramic, or other particulates maintaining the fracture width allows hydrocarbons to flow to the surface of the well. In addition to fracturing the rock, water also serves as a transport medium for the proppant. Accordingly, the hydraulic fracturing process requires millions of gallons of water per well. Often, a large percentage of the water used in hydraulic fracturing is recovered as flowback water.

Consequently, oil and gas companies must supply oil and gas wells with the requisite amount of water, and must manage the flowback and produced water recovered from the well. To accommodate the supply need, water is typically transported through temporary pipelines or trucked to the well site. However, water recovered from the well is unclean and filled with hydrocarbons, suspended solids, heavy metals, and bacteria. The recovered water must therefore be filtered and cleaned before it can be reused in the fracking process or introduced into the environment. For this reason, the recovered water is typically trucked from the well site to a filtering location, and then trucked from the filtering location to its next destination. The process of using trucks to transport the water increases the volume of traffic on roads and requires fossil fuels to power the trucks. Similarly, a company may construct a piping system to pump the water through the piping system to and from a filtering location, but such a piping system is a considerable expense. As an alternative to transporting the water by truck or constructing a piping system, a filtering company may set up a facility at the well site to filter the water, or bring in a large filtration system attached to a trailer to reuse the flowback water for the hydraulic fracturing process. However, this requires additional expense to set up a filtering facility. Furthermore, once the hydraulic fracture process is complete, the recovered water must be transported to another location.

In the prior art applicant is also aware of the following United States patents and published patent applications which attempt to provide mobile systems for water treatment:

U.S. Pat. No. 6,077,448 which issued Jun. 20, 2000, to Tran-Quok-Nam et al for An Oil/Grit Interceptor which discloses a multi-chambered tank providing partial separation of pollutants contained in effluent. With the exception of effluent flow via a bypass in the event of tank overloading, effluent drops into a first chamber and from the first chamber passes to a second chamber. Trash and debris is collected in the first chamber and free petroleum based products are separated and held in the second chamber. Effluent from the second chamber passes into a third chamber where sediment is separated.

U.S. Pat. No. 6,899,808 which issued May 31, 2005, to Ott for a System For Processing Polluted Water discloses using inline first, second and third containers where a pair of partitions separate the containers and where a corresponding pair of weirs are included in their respective partitions and are transversely offset from one another.

U.S. Pat. No. 7,578,930 which issued Aug. 25, 2009, to Williamson et al for A Mobile Water Treatment System discloses the use of separation and filtration components mounted on a trailer. The components are described as removing particulates and filtering contaminants from effluent water such as storm water, waste water, or drain water. The trailer based system is described as providing a mobile water treatment system which can be transported to a construction location or other storm water or waste water site on a temporary basis and used to treat the water by removing free and disbursed oils, capturing floatable debris, sediment and settleable solids.

U.S. Pat. No. 8,110,115 which issued Feb. 7, 2012, to Kennedy et al for A Mobile Water Treatment discloses transporting dirty fluid in a storage container on a motor vehicle between first and second locations wherein at the second location the fluid is filtered by a filtration system and discharged. A pump is configured to on-load fluid into the storage container and is also adapted to offload the fluid from the storage container once the fluid has been filtered.

United States published patent application, publication no. 2007/0246414, published on Oct. 25, 2007 in the application of Page et al for A Water Treatment And Apparatus Method describes the use of compartments for holding waste water and separator/recovery mechanisms, evaporation compartments, a condensation recovery system and a clean water holding compartment. In one disclosed embodiment, a platform such as a skid supports a phase separation tank, an evaporation tank with condenser, and a clean water recovery tank. Fluid transfer mechanisms interconnect the tanks. The phase separation tank may provide three phase separation into solids, water and oil fraction. The fluid transfer between the separation and evaporation tanks may pass through a transitional tank such as a floc tank.

United States patent application, publication no. 2008/0061003, published Mar. 13, 2008, in the application of Mueller for An Apparatus For Recycling Of Oil Based Drilling Fluid Contaminated With Water And Water Contaminated With Oil Based Drilling Fluid describes using an emulsion breaking tank, a water treatment tank, a filter press, and hydrocarbon filters. Mueller describes that there is a need for a skid-mounted apparatus to effectively break emulsions on an off shore rig thereby reducing the need to transport slop water on shore. Mueller describes, in one embodiment, the use of two modules wherein one module separates the bulk part of the water fraction from oil based/synthetic based drilling mud, from where the extracted water is pumped to the second module where it is treated with a flocculent to eliminate/minimize hydrocarbon, organic and heavy metal contamination. The treatment sludge containing the contaminant loaded flocculent is directed to a filter press for dewatering and solidification for transport and disposal. The cleaned water phase is then pumped over a further filter and discharged.

United States patent application, publication no. 2009/0178978, published Jul. 16, 2009, in the application of Beebe et al for Drilling Fluid Treatment Systems describes the use of at least one holding tank mounted on a base for holding well fluid to be treated, a centrifuge for centrifuging a mixture of well fluid and solids from the at least one holding tank to produce reusable fluid, and a mixing tank for mixing an aqueous solution for introduction to the well fluid held in the at least one holding tank. The aqueous solution includes flocculent and coagulant.

Beebe et al describe that U.S. Pat. No. 4,536,286 discloses a transportable waste treatment which is completely mobile and capable of treating high mud volumes. This system is self-contained having chemical storage, chemical pumps, sludge pumps, water pumps, laboratory, centrifuge, conveyors, etc., and has weight, height and width suitable for highway travel A skid incorporates three settling tanks and two chemical tanks for flocculation. Waste liquids containing solids enter a first settling tank and are mixed with flocculation chemicals. Solids settle to the tapered bottom of the tank for collection by a suction located at the apex of the tank bottom. Partially clarified liquid from the first settling tank overflows a weir to the next adjacent settling tank and similarly for the second to the third settling tank.

SUMMARY OF THE INVENTION

In summary, the mobile flocculation and water treatment system and method may be characterized in one aspect as including at least one tank and an adjacent pump house, all mounted on a single mobile platform such as a skid.

The tank is preferably a series of tanks or compartments having an inlet and an outlet at substantially opposite ends thereof. The pump house may substantially adjoin the downstream tank, compartment or end of the series of tanks. At least one pump is mounted in the pump house. Fluid conduits run from the pumps to the tank provide for pumping fluid to at least the inlet, and advantageously both to the inlet and from the outlet.

An overflow conduit is mounted in fluid communication between the downstream tank, compartment of downstream end of the series of tanks and the pump house whereby fluid overflow from the tanks is directed through the overflow conduit and into the pump house. The pump house has an upper zone atop a reservoir zone. The pumps are mounted in the reservoir zone. The reservoir zone is substantially watertight to provide secondary containment of a secondary containment fluid volume of the fluid.

The tanks are preferably an in-line plurality of tanks separated by a corresponding plurality of weirs, wherein each weir is of the higher elevation than a next most adjacent downstream weir. In particular the plurality of tanks may include three tanks, namely an upstream tank, a mid-stream tank and a downstream tank. The flow inlet directs the incoming fluid into the upstream tank. Thus the plurality of weirs may include a first weir between the upstream tank and the midstream tank, and a second weir between the midstream tank and the downstream tank. A common downstream wall separates the downstream tank and the pump house. The overflow conduit is in the common wall.

The elevation of the overflow conduit is great than the elevation of the first weir. The elevation of the second weir is less than the elevation of the first weir. The upper edges of the tanks have an elevation which is no less than the elevation of the overflow conduit.

Advantageously the pump house is in-line with the plurality of tanks and includes a water-tight, low-rise wall surrounding and sealed so as to be watertight with the floor of the pump house to thereby form the reservoir zone of the pump house. The pump house may further includes at least one filter cooperating with the pumps. An access door may be provided above the low rise wall of the reservoir zone. In one embodiment the low-rise wall stands approximately four inches high.

In a preferred embodiment a fluid diverting flume extends longitudinally along and over at least the upstream and midstream tanks. The flume has an upstream end cooperating with, to receive the fluid from, the inlet. The flume has selectively biasable doors, biasable between open and closed positions, along the flume for selectively directing the fluid flowing along the flume into either the upstream tank or the midstream tank. A fluid bypass may in addition to, or alternatively to cooperate with the flume to bypass the fluid around one or more of the plurality of tanks.

BRIEF DESCRIPTION OF THE DRAWINGS

FIG. 4b is, in end view, the end of the tank opposite to the end of FIG. 4a.

FIG. 5 is, in partially cut away plan view, the tank end of FIG. 4b.

FIG. 9 is, in perspective view, an enlarged view of the spillway of FIG. 8.

DETAILED DESCRIPTION OF EMBODIMENTS OF THE INVENTION

In one embodiment of the mobile flocculation and water treatment system according to the present invention, a tank 10 and an adjacent pump house 12 are mounted on a portable platform such as skid 14. In one advantageous use of the present system, which is not intended to be limiting, in the oil and gas industry so called "sweet" water is recycled for use in so called "fracking" or hydraulic fracturing operations which would benefit from the on-site treatment and reclamation of fracturing fluids such as by the settling clarification of treated fluids. Such fluids may be treated for example in a flocculation process to form a sludge which settles out in the tank leaving clarified fluid to be then further filtered before discharge for recycling.

Figure 1:
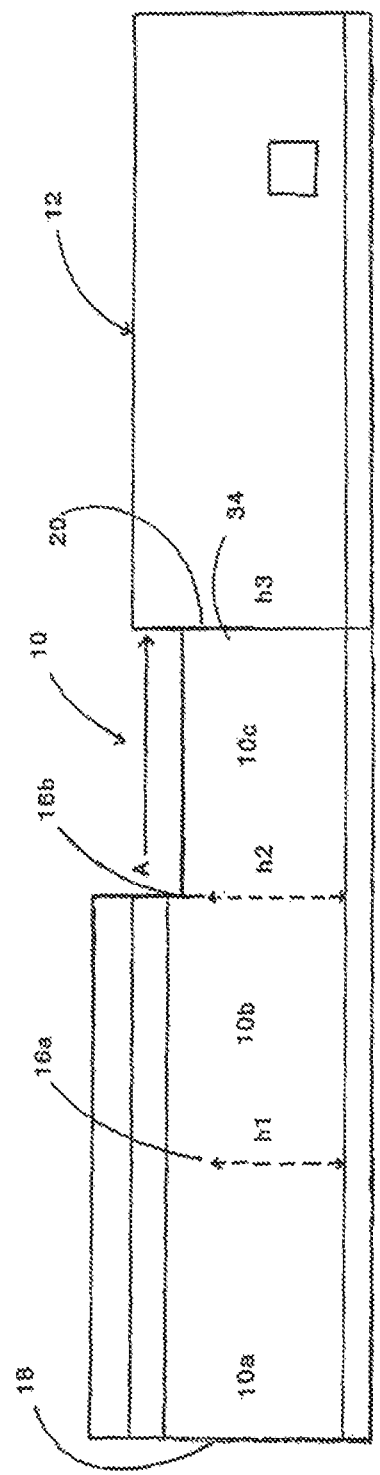
FIG. 1 is, in side elevation view, the fluid tank and pump house resting on a skid.
Figure 2:
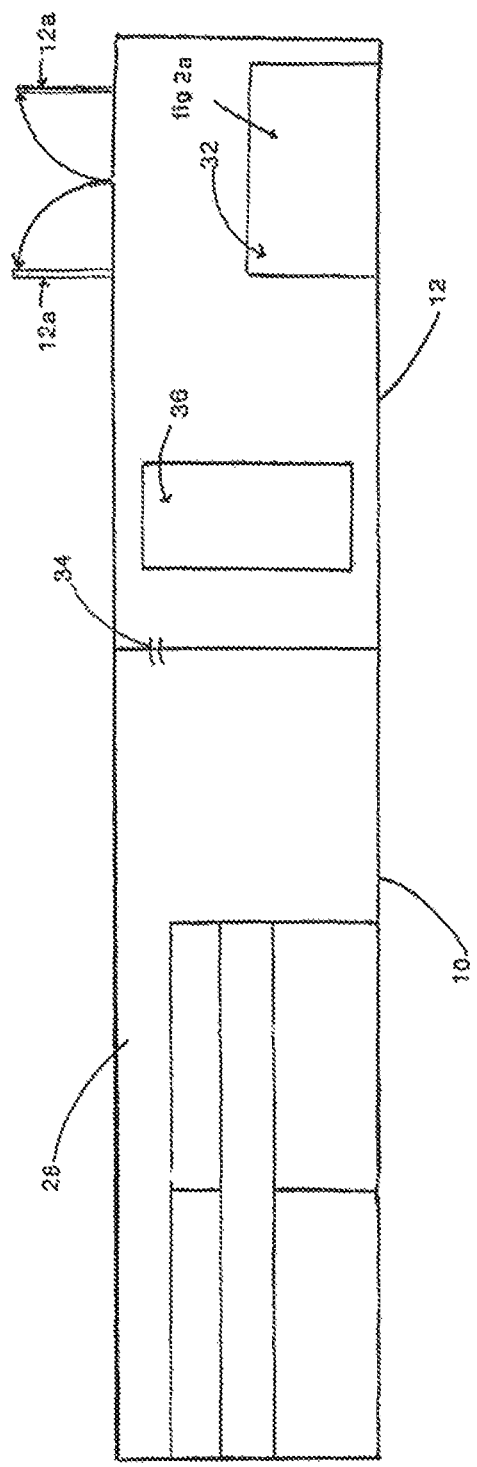
FIG. 2 is, in plan view, a diagramatic illustration of the tank and pump house of FIG. 1.
Figure 2A:
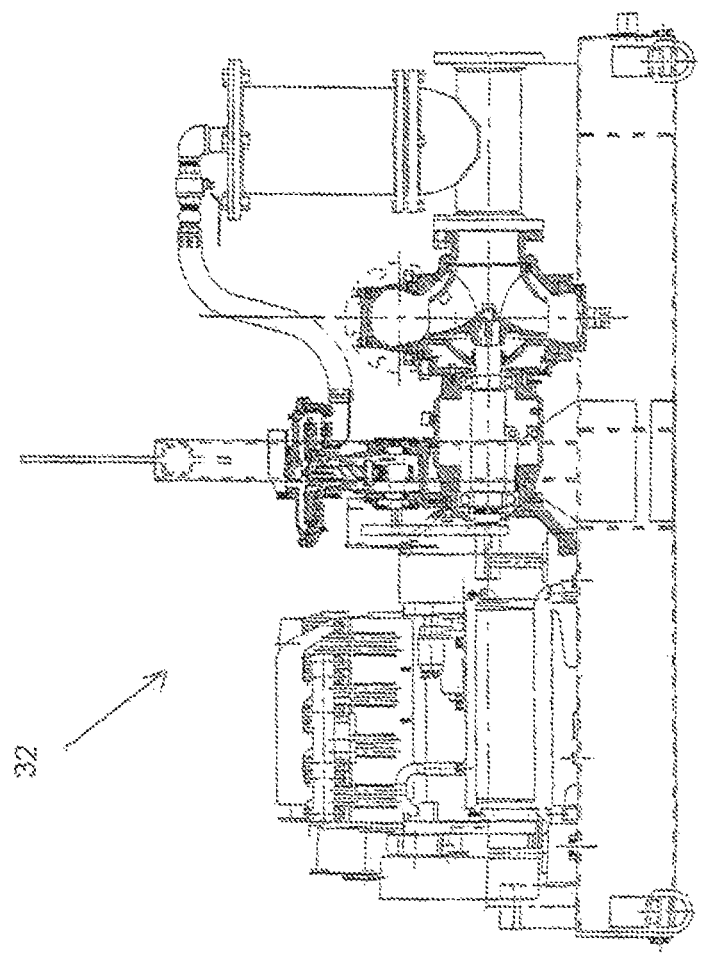
FIG. 2a is an enlarged side elevation view of one pumping system within the pump house of FIG. 2.
Figure 3:
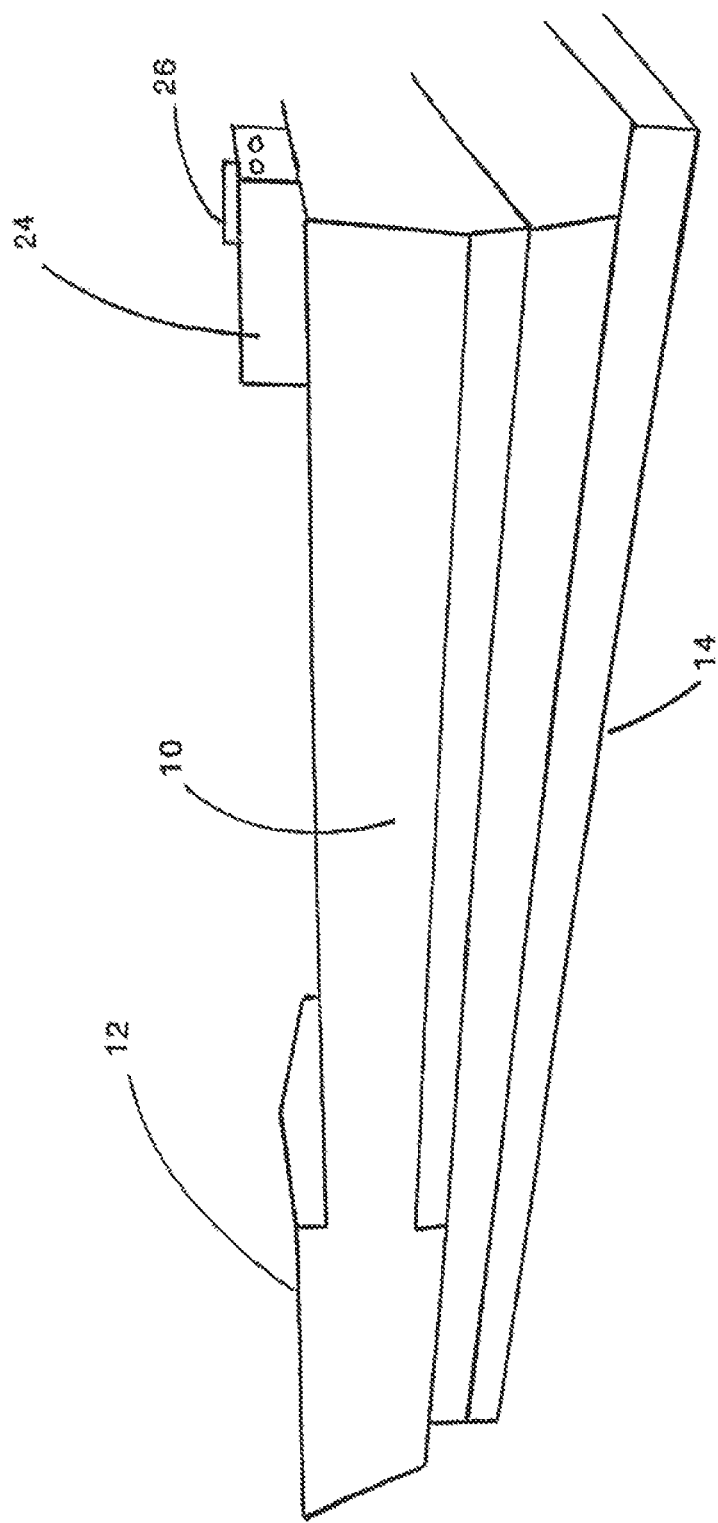
FIG. 3 is, in side perspective view, the skid mounted tank and pump house of FIG. 1.
Figure 4A:
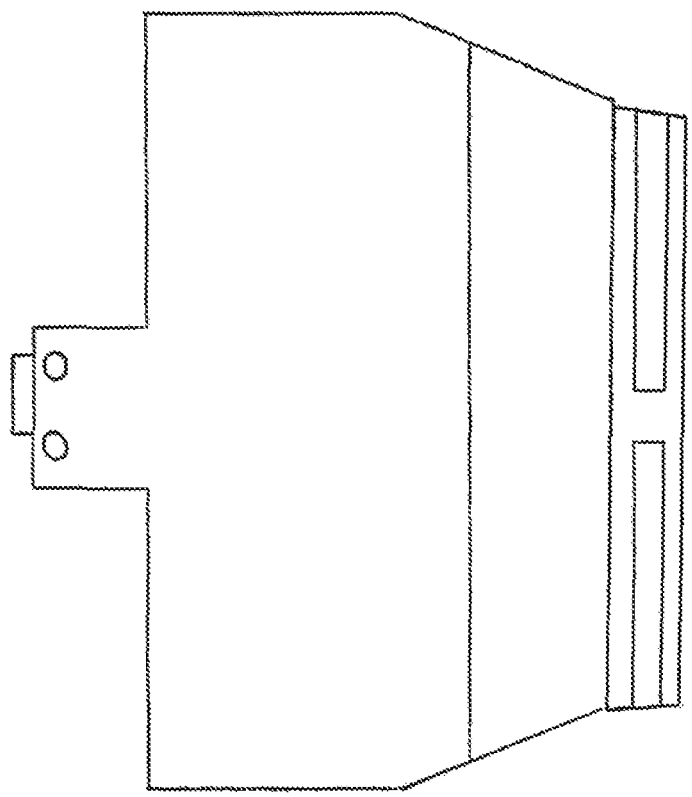
FIG. 4a is, in end elevation view, the end of the tank of FIG. 3.
Figure 4B:
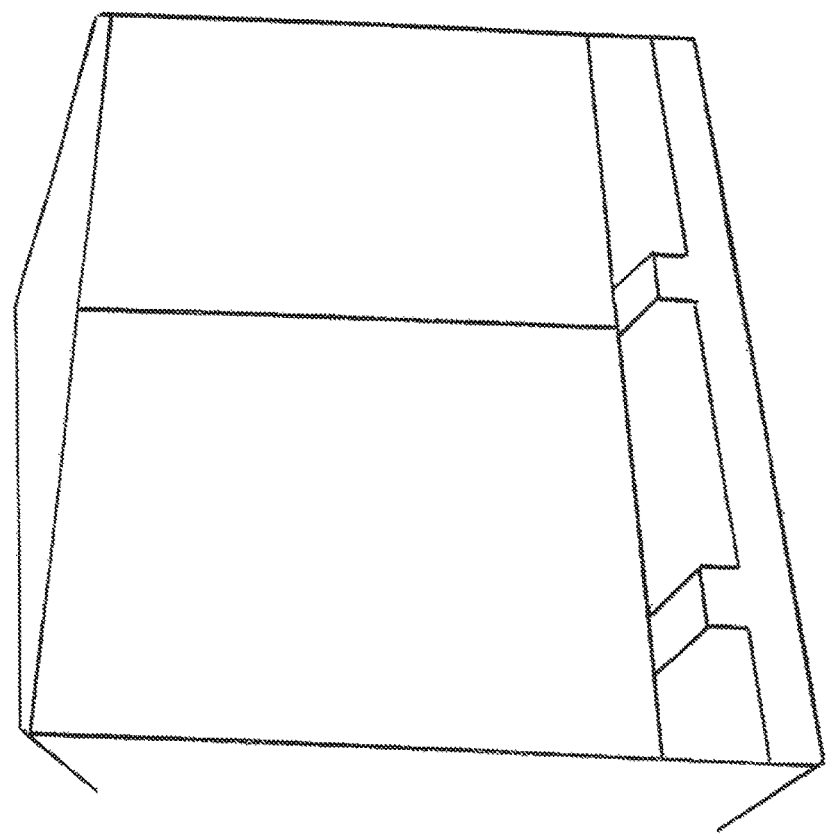
Figure 6:
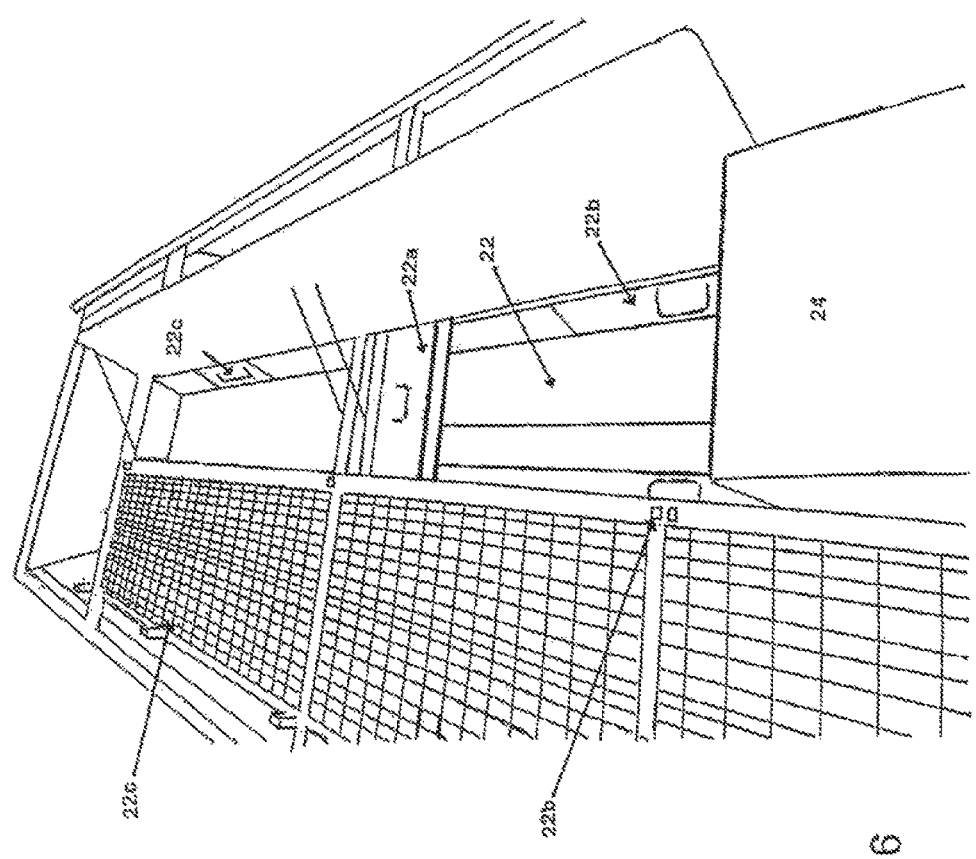
FIG. 6 is, in partially cut away top perspective view, a view from the tank end of FIG. 5 along the tank of FIG. 3, with the water trough covers in the open position.
Figure 7:
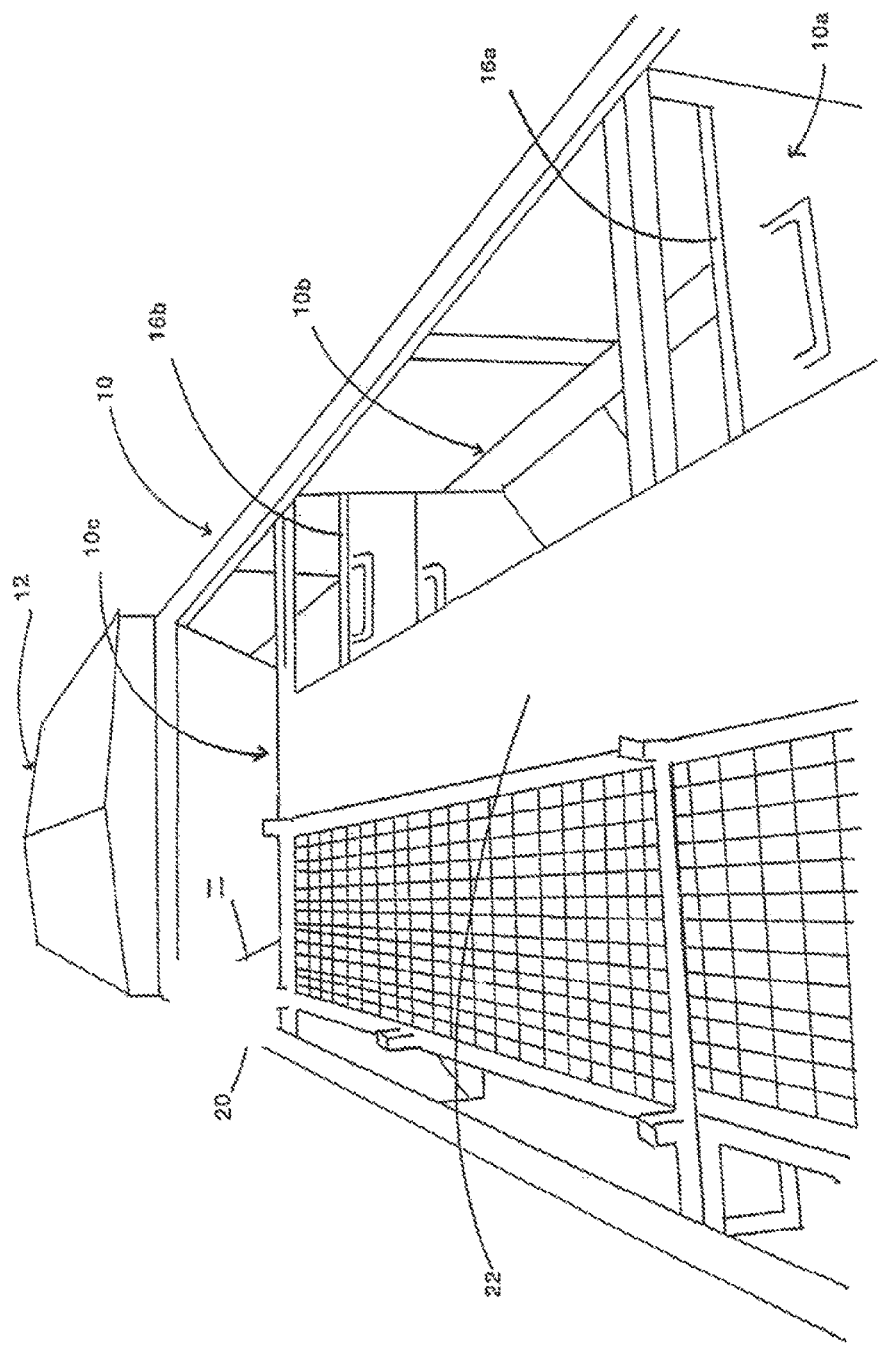
FIG. 7 is a top perspective view showing the water trough covers in their closed position.
Figure 8:
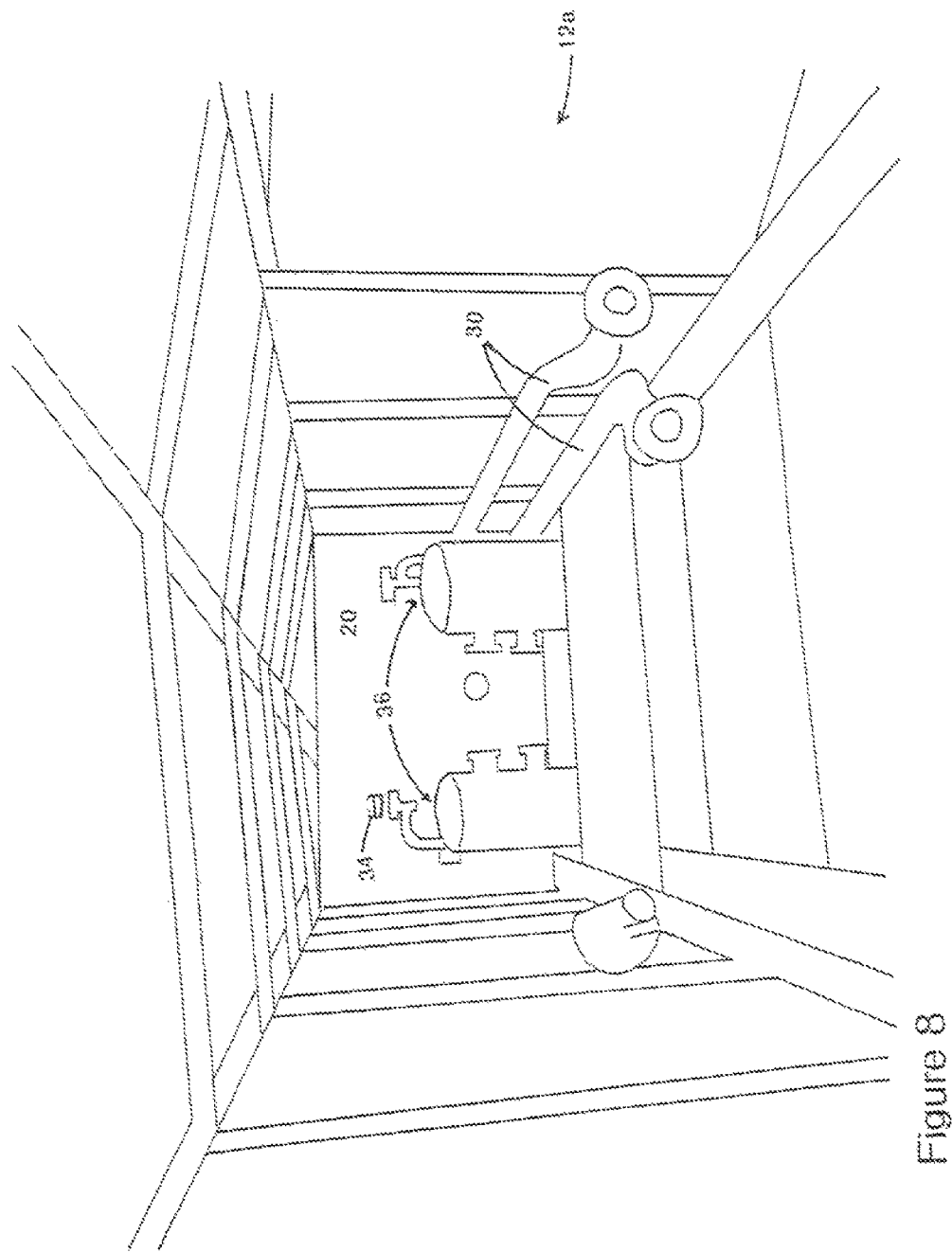
FIG. 8 is, in perspective view, the inside of the pump house of FIG. 2 looking from the doorway end of pump house at the filter units and spillway.

In one embodiment such as seen in FIG. 1, which is not intended to be limiting, the combined length of tank 10 and pump house 12 resting on skid 14 corresponds to the length of a conventional trailer, for example 56 feet. Advantageously, as illustrated, tank 10 and pump house 12 are mounted in-line on skid 14 so as to present a substantially uniform width, for example a width of 10 feet, again for convenient and legal loading on a conventional trailer. Within the 56 foot combined length, in one embodiment, tank 10 is approximately 30 feet long and includes a spaced apart pair of weirs, respectively weirs 16a and 16b forming in-line serial compartments 10a, 10b and 10c.

Contaminated water is pumped into compartment 10a through an upstream inlet so as to fill compartment 10a behind weir 16a. Weir 16a has a height h1 which is greater than the height h2 of weir 16b. In one embodiment height h1 may be substantially 54 inches, and height h2 may be substantially 51 inches. Compartment 10b is defined between weirs 16a and 16b. Compartment 10b is the next adjacent downstream compartment to compartment 10a. Compartment 10c is the next adjacent downstream compartment to compartment 10b and is defined between weir 16b and the downstream end wall 20 of tank 10.

As contaminated fluid such as return fluid from fracking operations is pumped into compartment 10a, once it reaches a level equivalent to height h1, it over flows weir 16a into compartment 10b. Similarly, compartment 10c is gravity fed as the level of the fluid in compartment 10b exceeds height h2. If flocculating chemicals are added to the fluid in one of the compartments, the resulting solids are allowed to settle out to form a sludge in the bottom of the compartment. Other solids are also allowed to settle out within the compartments so that the most clarified fluid is the fluid in the downstream most compartment 10c.

Pump house 12 adjacent end wall 20 may share a common end wall 20 and may have a length of for example 23 feet. Pump house 12 may house a duplex filter arrangement having a six inch so-called mission-style pump.

Contaminated water may be pumped into tank 10 through for example pipes having a diameter in the range of 3-4 inches. Inlet 18S is advantageously a pair of inlets that direct incoming water into the upstream end of a trough 22, although this is not intended to be limiting as other fluid conduits including open and closed-top channels would work; and herein collectively also referred to as a flume. An upstream diffuser, for example a six inch conventional diffuser (not shown), is employed to decrease the velocity of the water entering into trough or flume 22 and as well act to commence the settling out of sand or other solids from the incoming contaminated water. One or more such diffusers may be housed within a gas box 24. Gases which are entrapped within the inflow of contaminated water are allowed to escape so as to travel up a vent stack, for example, the eight inch diameter vent stack 26 illustrated. Incoming water leaving gas box 24 drops into trough or flume 22. Trough or flume 22 directs the incoming water into compartment 10a which effectively provides the first of three in-line compartments or tanks within tank 10. Compartment 10a may advantageously have dimensions of approximately 10 feet in length by 10 feet in width, which dimensions are not intended to be limiting. Again, solids in the incoming water are allowed to drop out and settle within compartment 10a.

Advantageously, approximately one foot upstream from weir 16a, that is, upstream relative to downstream flow direction A, an oil-phase weir (not shown) may be mounted so as to extend downwardly past the elevation h1 of weir 16a to thereby trap and hold any oils or other lighter-than-water fluids or solids floating in compartment 10a. Thus the lighter than water fluids or floating solids are inhibited from entering into compartment 10b.

In the illustrated embodiment compartment 10b is also a 10 foot by 10 foot sized compartment, although again the dimensions are not intended to be limiting. Solids that have not settled out from the fluid in compartment 10a are allowed to settle out in compartment 10b. Again, an oil-phase weir is mounted over and upstream of weir 16b to hold back any lighter-than-water fluids and floating solids that may have carried over weir 16a.

Trough or flume 22 may, as illustrated, extend over and along the complete length of both compartments 10a and 10b. A steel plate 22a mounts into trough or flume 22, for example approximately midway along trough or flume 22. Steel plate 22a may be mounted into trough or flume 22 for example by a sliding mount between guides mounted to the walls of trough or flume 22. Thus gate 22a is removable. With gate 22a installed into trough or flume 22, water flowing into trough or flume 22 from gas house 24 is contained behind gate 22a which blocks flow further downstream along through or flume 22. Thus the flow flows only into compartment 10a.

The outflow from trough or flume 22 into compartment 10a is controlled by removable gates 22b removably mounted as by a snug sliding fit into the side walls of trough or flume 22. Thus gates 22b are removed from trough or flume 22 when it is desired to fill compartment 10a. When it is desired to isolate compartment 10a for cleaning, gates 22b are remounted into trough or flume 22 and gate 22a is removed so that the incoming flow of contaminated water flows along the length of trough or flume 22 downstream so as to be above compartment 10b. In order to thus bypass compartment 10a gates 22c are removed from the downstream end of trough or flume 22 thereby allowing the incoming contaminated water to fill compartment 10b.

A further trough 28 may similarly be employed to bypass compartment 10b when it is desired to empty compartment 10b for cleaning.

The clarified water in compartment 10c is pumped and filtered for discharge. Suction lines having for example 2-4 inch diameters are mounted in fluid communication with compartment 10c. The upstream ends of the suction lines 30 are maintained off the bottom of tank 10 by the use of adjustable skimmers (not shown). A gauge (not shown) such as a float rod and ball arrangement, allows the fluid level in compartment 10c to be monitored from inside pump house 12. At least two float switches (not shown) and preferably three float switches in compartment 10c provide for the automatic activation and deactivation of pumps 32 mounted in pump house 12. In a preferred embodiment, the third float switch may be provided to detect a high fluid level in the compartment, for example at fluid levels at or exceeding approximately 69 inches elevation.

Preferably an overflow conduit such as spillway 34 is mounted for example in end wall 20 at a height h3 of 69 inches. Spillway 34 allows the water to spill over into a secondary containment in case of inadvertent overflow thereby minimizing the impact of spills. The secondary containment is provided by secondary containment reservoirs. In a preferred embodiment a water-tight lower reservoir zone of pump house 12 serves as one secondary containment reservoir. In that preferred embodiment, the lower reservoir zone includes a reservoir contained by a low-rise wall and the floor 12b to provide a sealed vessel for example allowing for the containment of 2000 litres of spilled water. Pump house 12 may include at least one door 12a. The low-rise wall is below the door and may for example be four inches in height to provide the lower water tight reservoir zone of pump house 12 which provides the secondary containment reservoir.

An additional secondary containment reservoir may be provided around the filter unit 36 which advantageously provides yet a further 2000 litre containment vessel.

Inside pump house 12 a suction line 30 runs from the skimmers to a diesel powered mission style pump 32. A shut off valve 30a on line 30 isolates the tank 10. Another valve (not shown) that leads to outside of tank 10 provides for out of pumping external tanks or trucks. A further two inch suction valve on line 30 allows pumping out of the reservoirs any water that may enter the secondary reservoirs. The water is pumped through the pumps 32 into a duplex bag filter unit 36. The water is filtered as appropriate for the application. Because filter unit 36 is a duplex system the filters may be changed on the fly by personnel operating the tank. A by-pass valve is provided (not shown), located in the piping behind the filter unit, so that water may be pumped without filtration. Once the water has been filtered it may be reintroduced to the frac water compartment(s) of tank 10, using two-six inch outlets on the pump house.

The pumps 32 may be equipped with automatic start and stop. Thus tank 10 may always be kept at a safe level to eliminate spills. In case of emergency the pump 32 will start up and pump water that may enter tank 10 without the operator knowing. The pumps 32 may also be equipped with an automatic RODA-DEACO valve that will shut the motor down in the event that flammable gas is introduced to the intake. The intake and exhaust for the motor are advantageously on the outside of the pump house, for example, at twenty-three feet from the open top on tank 10 as may be required by regulations.

Inside the pump house there may be a beacon light that will come on when the high level alarm float is triggered. There may also be the other visual and audible warning devices may be provided on the outside of the pump house to let the operator know if there is a problem. An exhaust fan (not shown) may be provided to exhaust any hazardous gases that may enter the pump house.

Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method for providing mobile flocculation and fluid treatment comprising the steps of:
   a) providing at least one tank having an inlet and an outlet at substantially opposite ends thereof,
   b) providing a pump house substantially adjoining said at least one tank, at least one pump mounted in said pump house,
   c) an overflow conduit in fluid communication between said at least one tank and said pump house,
   d) providing a mobile platform and mounting said at least one tank and said pump house on said mobile platform,
   e) pumping fluid for treatment into and through said inlet so as to flow into said at least one tank,
   f) after a dwell and settling-out time of said fluid within said at least one tank whereby solids settle out of said flow in said at least one tank, said flow exiting from said outlet, and
   g) in the event of fluid overflow from said at least one tank, said fluid overflow being directed through said overflow conduit into said pump house for containment within secondary containment reservoirs within the pump house, wherein secondary containment reservoirs include a first secondary containment reservoir defined by a low-rise wall extending contiguously around and sealed to a floor of said pump house, and a secondary containment reservoir within said first secondary containment reservoir.

2. The method of claim 1 wherein said step of providing said at least one tank includes providing an in-line plurality of tanks separated by a corresponding plurality of weirs, wherein each weir of said plurality of weirs is of the higher elevation than a next most adjacent downstream weir of said plurality of weirs.

3. The method of claim 2 wherein said plurality of tanks includes three tanks, said three tanks comprising an upstream tank, a midstream tank and a downstream tank, wherein said inlet directs said fluid into said upstream tank.

4. The method of claim 3 wherein said plurality of weirs includes a first weir between said upstream tank and said midstream tank, and a second weir between said midstream tank and said downstream tank, and wherein a common wall separates said downstream tank and said pump house, and wherein said overflow conduit is in said common wall, and wherein an elevation of said overflow conduit is greater than an elevation of said first weir, and an elevation of said second weir is less than said elevation of said first weir, and wherein said plurality of tanks have upper edges having an upper edge elevation which is no less than said elevation of said overflow conduit.

5. The method of claim 4 wherein said pump house is in-line with said plurality of tanks, and wherein said pump house includes an access door, and wherein said low-rise wall is below said access door.

6. The method of claim 5 wherein said pump house further includes at least one filter cooperating with said at least one pump.

7. The method of claim 3 wherein a fluid diverting flume extends longitudinally along and over at least said upstream and midstream tanks, and wherein said flume has an upstream end cooperating with, to receive said fluid from, said inlet, and wherein said flume has selectively biasable doors, biasable between open and closed positions, along said flume for selectively directing said fluid flowing along said flume into either said upstream tank or said midstream tank.

8. The method of claim 7 further comprising a fluid bypass cooperating with said flume to bypass said fluid around one or more of said plurality of tanks.

9. The method of claim 1 wherein said at least one tank and said pump house are mounted in-line on a mobile platform.

10. The method of claim 9 wherein said mobile platform is a skid.

* * * * *